(12) United States Patent
Noyes et al.

(10) Patent No.: US 12,491,167 B2
(45) Date of Patent: Dec. 9, 2025

(54) PLANT BASED SUPPLEMENT COMPOSITIONS

(71) Applicant: THE GOOD KARMA Company, LLC, Pittsboro, NC (US)

(72) Inventors: William Richard Noyes, Grand Forks, ND (US); Anil Potti, Grand Forks, ND (US)

(73) Assignee: THE GOOD KARMA COMPANY, LLC, Pittsboro, NC (US)

( * ) Notice: Subject to any disclaimer, the term of this patent is extended or adjusted under 35 U.S.C. 154(b) by 468 days.

(21) Appl. No.: 17/952,804

(22) Filed: Sep. 26, 2022

(65) Prior Publication Data

US 2023/0100108 A1    Mar. 30, 2023

Related U.S. Application Data

(60) Provisional application No. 63/261,765, filed on Sep. 28, 2021.

(51) Int. Cl.

| | | |
|---|---|---|
| *A61K 36/00* | (2006.01) | |
| *A23L 2/52* | (2006.01) | |
| *A23L 33/105* | (2016.01) | |
| *A23L 33/155* | (2016.01) | |
| *A23L 33/16* | (2016.01) | |
| *A61K 9/00* | (2006.01) | |
| *A61K 31/121* | (2006.01) | |
| *A61K 31/198* | (2006.01) | |
| *A61K 31/375* | (2006.01) | |
| *A61K 31/4188* | (2006.01) | |
| *A61K 31/59* | (2006.01) | |
| *A61K 31/714* | (2006.01) | |
| *A61K 33/06* | (2006.01) | |
| *A61K 33/26* | (2006.01) | |
| *A61K 36/53* | (2006.01) | |
| *A61K 36/55* | (2006.01) | |
| *A61K 36/81* | (2006.01) | |
| *A61K 36/88* | (2006.01) | |
| *A61K 36/9066* | (2006.01) | |
| *A61K 36/9068* | (2006.01) | |

(52) U.S. Cl.
CPC .............. *A61K 31/121* (2013.01); *A23L 2/52* (2013.01); *A23L 33/105* (2016.08); *A23L 33/155* (2016.08); *A23L 33/16* (2016.08); *A61K 9/0095* (2013.01); *A61K 31/198* (2013.01); *A61K 31/375* (2013.01); *A61K 31/4188* (2013.01); *A61K 31/59* (2013.01); *A61K 31/714* (2013.01); *A61K 33/06* (2013.01); *A61K 33/26* (2013.01); *A61K 36/53* (2013.01); *A61K 36/55* (2013.01); *A61K 36/81* (2013.01); *A61K 36/88* (2013.01); *A61K 36/9066* (2013.01); *A61K 36/9068* (2013.01); *A23V 2002/00* (2013.01)

(58) Field of Classification Search
CPC .................. A61K 36/9068; A61K 36/9066
See application file for complete search history.

(56) References Cited

U.S. PATENT DOCUMENTS

| | | |
|---|---|---|
| 5,494,668 A | 2/1996 | Patwardhan |
| 5,916,565 A | 6/1999 | Rose et al. |
| 6,264,995 B1 | 7/2001 | Newmark et al. |
| 6,517,861 B2 | 2/2003 | Singh et al. |
| 7,923,044 B2 | 4/2011 | Bias |
| 9,446,100 B2 | 9/2016 | Holstein et al. |
| 2006/0228426 A1 | 10/2006 | Cyr |
| 2009/0252758 A1 | 10/2009 | Mazed et al. |
| 2010/0202980 A1 | 8/2010 | Fogel |
| 2011/0206721 A1 | 8/2011 | Nair |
| 2017/0020178 A1 | 1/2017 | Rubin |
| 2019/0030104 A1* | 1/2019 | Shetty ................. A61P 35/00 |
| 2020/0397711 A1 | 12/2020 | Lee |
| 2020/0397841 A1 | 12/2020 | Lakshmi et al. |

FOREIGN PATENT DOCUMENTS

| | | |
|---|---|---|
| CA | 3176789 C | 6/2025 |
| WO | 2014083438 | 11/2014 |
| WO | 2015068112 | 5/2015 |
| WO | 2020039277 | 2/2020 |
| WO | 2020058817 | 3/2020 |
| WO | 2020231906 | 11/2020 |

OTHER PUBLICATIONS

Dominguez, Ligia J., et al., "Nutritional prevention of cognitive decline and dementia"; Acta Biomedica, 89(2), (2018), 276-290.
Durazzo, Alessandra, et al., "From Plant Compounds to Botanicals and Back: A Current Snapshot", Molecules, 23(8): 1844, (2018), 11 pgs.
Lopes, C. M., et al., "Phytotherapy and Nutritional Supplements on Breast Cancer", Biomed Res Int., vol. 2017, Article ID 7207983, (2017), 42 pgs.
Perkins, Kimberly, et al., "Efficacy of Curcuma for Treatment of Osteoarthritis", J Evid Based Complementary Altern Med., 22(1), (2016), 156-165.
"Mexican Application Serial No. MX a 2022 011981, Office Action mailed Oct. 12, 2022", with machine English translation, 4 pages.
"Mexican Application Serial No. MX a 2022 011981, Response filed Nov. 24, 2022 to Office Action mailed Oct. 12, 2022", with English claims, 10 pages.
"European Application Serial No. 22197658.2, Extended European Search Report mailed Feb. 3, 2023", 7 pgs.
"Mexican Application Serial No. MX a 2022 011981, Voluntary Amendment filed Jan. 9, 2023", with English claims, 7 pages.
"European Application Serial No. 22197658.2, Response filed Sep. 29, 2023 to Extended European Search Report mailed Feb. 3, 2023", 9 pgs.

(Continued)

*Primary Examiner* — Qiuwen Mi
(74) *Attorney, Agent, or Firm* — SCHWEGMAN LUNDBERG & WOESSNER, P.A.

(57) ABSTRACT

A composition comprising, for example, 1 wt-% to 10 wt-% curcumin or turmeric; 50 wt-% to 60 wt-% ginger; 10 wt-% to 20 wt-% ashwagandha; and 25 wt % to 30 wt % Tulsi herb, relative to the total weight of curcumin, ginger, ashwagandha and Tulsi herb, and methods of making and using the compositions, are provided.

10 Claims, No Drawings

(56) References Cited

OTHER PUBLICATIONS

"Canadian Application Serial No. 3,176,789, Examiners Rule 86(2) Report mailed Jan. 8, 2024", 4 pgs.
"European Application Serial No. 22197658.2, Communication Pursuant to Article 94(3) EPC mailed Feb. 5, 2024", 6 pgs.
"Canadian Application Serial No. 3,176,789, Response filed May 7, 2024 to Examiners Rule 86(2) Report mailed Jan. 8, 2024", 15 pgs.
"European Application Serial No. 22197658.2, Response filed Aug. 5, 2024 to Communication Pursuant to Article 94(3) EPC mailed Feb. 5, 2024", w claims, 8 pgs.
Amazon, "Organic Moringa Extract", [Online]. Retrieved from the Internet: https: www.amazon.com Organic-Ashwagandha-Antioxidant-Inflammatory-Supplements dp B08SKG7Y3V, (Accessed online Apr. 5, 2024), 11 pages.
Amazon, "Turmeric Curcumin Extract", [Online]. Retrieved from the Internet: https: www.amazon.com Turmeric-Ashwagandha-Boswellia-Inflammatory-Digestive dp B08SHMVF34, (Accessed online Apr. 5, 2024), 8 pages.
Amazon, "Suvita Ayurvedic 100% Herbal", [Online]. Retrieved from the Internet: https: www.amazon.sg Suvita-Ayurvedic-100-Herbal-Ashwagandha dp B077W355WF, (Accessed online Apr. 5, 2024), 4 pages.
Huang, E Chu, "Zyflamend a polyherbal mixture, down regulates class I and class II histone deacetylases and increases p21 levels in castrate-resistant prostate cancer cells", BMC Complementary and Alternative Medicine 14:68, (Feb. 21, 2014), 15 pages.
Ponnusam, Yuvaraj, "Antioxidant Activity of the Ancient Herb, Holy Basil in CCl4-Induced Liver Injury in Rats", Ayurvedic 2 2 doi 10 14259 av v22 176, (Nov. 2015), 8 pages.
Prabhudesai, Ravindra Vaman, "A Synergestic Herbo Mineral Formulation With Enhanced Analgesic Properties and Process of Preparation for the Same", IN01830MU2013A, (May 24, 2013), 5 pages.
Shashi, Alok, "Herbal antioxidant in clinical practice: A review", Asian Pacific Journal of Tropical Biomedicine, vol. 4, No. 1, (Jan. 1, 2014), 7 pgs.
"European Application Serial No. 22197658.2, Summons to Attend Oral Proceedings mailed Nov. 25, 2024", 7 pgs.
"European Application Serial No. 22197658.2, Response filed Mar. 14, 2025 to Summons to Attend Oral Proceedings mailed Nov. 25, 2024", w/ claims, 12 pgs.
"European Application Serial No. 25175786.0, Extended European Search Report mailed Aug. 22, 2025", 6 pgs.

\* cited by examiner

PLANT BASED SUPPLEMENT COMPOSITIONS

CROSS-REFERENCE TO RELATED APPLICATIONS

This application claims the benefit of the filing date of U.S. application No. 63/261,765, filed on Sep. 28, 2021, the disclosure of which is incorporated by reference herein.

BACKGROUND

The impact of diet and nutrition on numerous diseases and disorders has been described, e.g., the impact on age-associated cognitive decline, osteoarthritis and cancer (Dominguez et al., *Acta Biomed.*, 89:276 (2018); Perkins et al., *J. Evid. Based Comple. Altern. Med.*, 22:156 (2017)). Various minerals, micronutrients, and vitamins with antioxidant/anti-inflammatory properties have been studied. For example, curcuminoids, magnesium, and garlic, among others, may have a beneficial effect on cognition (Dominguez et al., 2018), and *curcuma* may have therapeutic effects in osteoarthritis patients (Perkins et al., 2017). Complementary and Alternative Medicine (CAM) use is increasing in the general public and in cancer patients (Lopes et al., *Biomed. Res. Int.*, 2017; PMID: 28845434). CAM includes natural products which include dietary supplements (e.g., vitamins, minerals, and probiotics) and phytotherapeutic products. However, Lopes et al. (2017) note that some natural products can interfere with therapy, e.g., in breast cancer patients.

The field of food supplements that include botanicals appears varied and growing. The growth of this sector is encouraged by greater consumer interest in improving physical and mental well-being and health status.

The term botanicals may by synonymous with herbal remedies, herbal drugs, herbal medicinal products, herbal medicines, and botanical drugs. Herbal medicinal products may include to any medicinal product, exclusively containing as active ingredients one or more herbal substances or one or more herbal preparations, or one or more such herbal substances in combination with one or more such herbal preparations (2004 by Directive 2004/24/EC of the European Parliament and of the Council of 31 Mar. 2004). According to the World Health Organization (WHO), herbal medicines include herbs, herbal materials, herbal preparations and finished herbal products, that contain as active ingredients parts of plants, or other plant materials, or combinations. Botanicals are made of single herbs or by mixing different herbs, from raw material of whole plants or parts of them, and include flowering herbs, leaves, leaf exudate, fruits, berries, roots, rhizomes, fungi, microorganisms, and algae.

SUMMARY

The present compositions include natural ingredients including but not limited to ashwagandha (also referred to as *Withania somnifera*, Indian *ginseng*, gooseberry or winter cherry), turmeric which comprises curcumin (*Curcuma* sp. such as *Curcuma longa*), holy basil (also referred to as Tulsi or *Ocimum tenuiflorum*) and ginger (also referred to as *Zingiber officinale* and may include syussai whole ginger extract) in amounts that provide health benefits, e.g., homeopathic benefits, nutritional benefits or otherwise supplement health in a mammal such as a human. In one embodiment, the mammal may consume one or more doses, e.g., servings, of a composition that includes Syussai whole ginger extract (e.g., about 1 gm to about 5 gm, or about 1 gm to about 3 gm, such as 2 gm, per day or about 50 mg/kg to about 200 mg/kg per day or about 50 mg/kg to about 100 mg/kg). In one embodiment, the mammal may consume one or more doses of a composition comprising ashwagandha (e.g., about 250 mg/day to about 1000 mg/day or about 250 mg/day to about 600 mg/day, such as about 300 mg/day to about 500 mg/day). In one embodiment, the mammal may consume one or more doses of a composition comprising Tulsi herb (e.g., about 250 mg/day to about 2 gm/day, such as about 500 mg/day to about 1 gm/day). In one embodiment, the mammal may consume one or more doses of a composition comprising turmeric (e.g., having curcumin comprising tetrahydrocurcumin, demethoxycurcumin, or bisdemethoxycurcumin, at dose of about 10 mg/day to about 300 mg/day such as about 75 mg/day to about 225 mg/day, e.g., in 2 to 4 doses of about, for example, 25 mg to 100 mg per dose. Curcumin analogs may also be employed, analogs including but not limited to, e.g., diarylpentanoids, 6-gingerol, 6-paradol, 6-shogaol, cassumunin A, cassumunin B, dehydrozingerone, dibenzoylmethoane, isoeugenol, yakuchinone A, yakuchinone B or analogs disclosed in Vyas et al. (*Curr. Pharm. Res.*, 19:2047 (2013), Agarwol et al. (*Med. Res. Rev.*, 30:818 (2010), Chainglo et al. (*Ex. Op. Drug Dis.*, 14:821 (2019) or Oglah et al. (*Med. Chem. Res.*, 29:479 (2020), the disclosures of which are incorporated by reference herein.

In one embodiment, the mammal may consume one or more doses of a composition comprising turmeric or curcumin at a dose of about 50 mg/day to about 400 mg/day, e.g., about 100 mg/day to about 200 mg/day. In one embodiment, the mammal may consume about 1 gm to about 3 gm, such as 2 gm, per day or about 50 mg/kg to about 100 mg/kg per day of Syussai whole ginger extract, about 250 mg/day to about 600 mg/day, such as about 300 mg/day to about 500 mg/day of ashwagandha, about 250 mg/day to about 2 gm/day, such as about 500 mg/day to about 1 gm/day, tulsi herb, and about 10 mg/day to about 300 mg/day such as about 50 mg/day to about 200 mg/day of turmeric or curcumin, e.g., in one or more servings of a composition within the scope of this disclosure. In one embodiment, the mammal may consume one or more doses (servings) of a composition comprising turmeric or curcumin at a dose of about 50 mg/day to about 300 mg/day, e.g., about 100 mg/day to about 200 mg/day. In one embodiment, the mammal may consume about 1 gm to about 3 gm, such as 2 gm, per day or about 50 mg/kg to about 100 mg/kg per day of Syussai whole ginger extract, about 250 mg/day to about 600 mg/day, such as about 300 mg/day to about 500 mg/day ashwagandha, about 250 mg/day to about 2 gm/day, such as about 500 mg/day to about 1 gm/day, of tulsi herb, and about 50 mg/day to about 300 mg/day such as about 100 mg/day to about 200 mg/day of turmeric or curcumin. In one embodiment, the composition may include ground flax seed, e.g., about 10 gm/day to about 50 gm/day such as about 25 gm/day to about 35 gm/day. In one embodiment, the daily amount to be consumed (in one or more servings) may be from about 0.05 g to about 5 g of ginger, e.g., about 0.05 g to about 0.5 g per 8 oz, up to 5 g/day or about 100 to about 500 mg/kg of ginger, about 100 mg to about 2 g ashwagandha, e.g., about 100 to about 500 mg per 8 oz or up to 2 g/day of ashwagandha, about 0.25 g to about 2 g tulsi herb, e.g., about 250 to about 500 mg per 8 oz or up to 2 g/day of tulsi herb, and about 25 mg to about 2 g turmeric or curcumin, e.g., about 25 mg to about 250 mg of curcumin per 8 oz or up to 2 g/day. In one embodiment, the composition is a liquid composition that minimizes the medicinal taste of one or more supplements in the composition, e.g., the composition is a drink/beverage supplement such as a green tea, blended fruit, protein-based, or a milk-based beverage supplemented with the composition, either in individual servings having the daily amount of the components, or less than a daily amount, such as ½, ⅓ or ¼ of the daily amount. In one embodiment, one or more of the ingredients (components) in the composition may have cellular restorative or repair properties, for example, properties including but not limited to restorative or repair properties, remedial properties for side effects associated with various medical therapies properties including but not limited to decreasing fatigue, decreasing nausea, increasing immune function, providing an anti-inflammatory effect and optionally providing an anti-oxidant effect. In one embodiment, the composition includes components (e.g., plant based components) with little or no anti-oxidant activity. In one embodiment, the composition includes one component (e.g., plant based component) with anti-oxidant activity, e.g., curcumin In one embodiment, the composition is a powder or liquid composition, e.g., a concentrate. In one embodiment, the powder is added to a beverage, e.g., combined with tea such as green tea, blended fruit, fruit juices, soy milk, cow's milk, oat milk, almond milk, coconut milk, lemonade, seltzers, ciders, cannabidiol or alcohol-based drinks.

One or more embodiments described herein provide a supplement composition in powder (or other form such as a bar) that is a mixture of two or more of ashwagandha, turmeric or curcumin, holy basil, and ginger in amounts to provide nutritional or other benefits. The base supplement powder or liquid may further contain at least one ingredient such as a sweetener ingredient selected from the group of: cyclamate, saccharine, aspartame, sulfame potassium, sucralose, sugar alcohols, stevioside, *stevia*, sucrose, glucose, maltose, luohan, xylitol and honey in an amount effective to provide a pleasant taste to the composition of interest, e.g., to mask the unpleasant taste, for example, a pungent or bitter taste of one or more of the ingredients. The sweetener, or mixture of sweeteners, may therefore be provided in an amount from about 0.5 wt % to about 2.0 wt %, about 0.1 wt % to about 1.0 wt %, or about 1.0 wt % to about 3.0 wt %, based on the total weight of the composition. Suitable sweeteners are sucralose and *stevia* used individually or in combination. Other suitable sweeteners include xylitol, honey, luohan, cane sugar or maple syrup.

In addition to ashwagandha, turmeric, holy basil and ginger, the composition may also contain at least one other ingredient (plant, plant part, or any extract thereof) including but not limited to cumin (*Cuminum cyminum*), black pepper (*Piper nigrum*), long pepper (*Piper longum*), cinnamon (*Cinnamonum zeylanicum*), coriander (*Coriandrum sativum*), red pepper (*Capsicum frutescens*), clove (*Syzygium aromaticum*), tejpat (*Cinnamon tamala*), fennel (*Foeniculum vulgare*), Kaala Jeera (black cumin), cardamom (*Amomum subulatum*), cardamom long, kalonji (*Nigella sativa*), ajowan (*Trachyspermum ammi*), mint (*Mentha piperta*), sesame seeds (*Sesamum indicum*), asafetida (*Ferula narthex*), curry leaves (*Murrava koenigii*), pomagranate (*Punica granatum*), nutmeg (*Myristica fragrans*), saffron (*Coccus sativus*), dill (*Anethum graveolens*), oregano (*Origanum vulgare*), coriander (*Coriandrum sativum*), parsley (*Petroselinum crispum*), camphor (*Cinnamomum camphor*), licorice (*Glycyrrhiza glabra*), caraway (*Carum carvi*), mustard (*Brassica juncea*), tamarind (*Tamarindus indica*), rosemary (*Rosmarinus officinalis*), onion (*Allium fistulosum*), garlic (*Allium sativum*), almonds (*Amygdalus comunis*), cashews (*Anacardium occidentale*), walnut (*Juglans nigra*), mace (*Myristica fragrans*), mango (*Magnifera indica*), prunes (*Prunus domestica*), raisins (*Vilis vinifera*), pecans (*Carya illinoensis*), figs (*Ficus carica*), fenugreek (*Trigonella foneum-gracium*), fenugreek seeds, til (*Sesamum indicum*), lemon grass (*Cymbogogon flexusosus*), ginseng, lutein, caraway seed, juniper berries, spearmint, mace, fennel, nutmeg, sage, hyssop, bee balm, lemon balm, sage, savory, thyme, bilberry, St. John's Wort, milk thistle, tea, green tea, purslane, grape seed, ginko, King Solomon's Seal, peppermint, *sassafras*, cocoa, cocoa powder, chocolate powder, vanilla, lipids, lecithin, soy lecithin, carbohydrates (sugars, starches, etc.), fats (polyunsaturated, monounsaturated, or saturated), grains, malts, and barley malt. Other ingredients may include sources of protein, e.g., nuts, and/or sources of fiber such as fruit and/or vegetables. In one embodiment, the other ingredient(s) may be present in an amount from about 0.1 wt % to about 20 wt %, about 1.0 wt % to about 30 wt %, or about 5.0 wt % to about 25 wt %, based on the total weight of the composition. In one embodiment, the other ingredient(s) may be present in an amount from about 0.1 wt % to about 20 wt %, about 1.0 wt % to about 30 wt %, or about 5.0 wt % to about 25 wt %, based on the total weight of the combination of ginger, ashwagandha, basil and turmeric, curcumin or tetrahydrocurcumin.

One or more illustrative embodiments of the composition may be in the form of a liquid (aqueous) dietary supplement containing (i) the composition; (ii) a liquid nutraceutically acceptable carrier, such as tea, e.g., green tea, milk, such as cow's milk, soy milk, almond milk oat milk, or pureed fruit such as a fruit smoothie; and optionally (iii) at least one ingredient including but not limited to biotin, vitamin C, iron, vitamin D, L-glutamine, vitamin B12, garlic, flax seed, and/or magnesium, optionally (iv) a sweetener ingredient selected from the group of cyclamate, saccharine, aspartame, sulfur potassium, sucralose, sugar alcohols, stevioside, *stevia*, sucrose, glucose, xylitol, luohan, maltose and honey, and any combinations or subcombinations thereof. A nutraceutically acceptable carrier may include, for example, green tea, fruit juices, non-citrus juices, dairy products, substitutes for dairy products, or carbonated or non-carbonated beverages. In one embodiment, the composition, e.g., a powder or liquid, does not include an anti-oxidant such as Vitamin E, zinc or selenium.

In one embodiment, turmeric or curcumin, e.g., which includes the active compounds desmethoxycurcumin and/or tetrahydroxycurcumin, may be present in an amount from about 2 wt % to about 10 wt % based on the total weight of the ashwagandha, holy basil, turmeric (or curcumin) and ginger. In one embodiment, the holy basil may be present in an amount from about 20 wt % to about 30 wt % based on the total weight of the ashwagandha, holy basil, turmeric or curcumin and ginger. In one embodiment, the ashwagandha may be present in an amount from about 10 wt % to about 20 wt % based on the total weight of the ashwagandha, holy basil, turmeric or curcumin and ginger. In one embodiment, the ginger may be present in an amount from about 50 wt % to about 60 wt % based on the total weight of the ashwagandha, holy basil, turmeric or curcumin and ginger.

In one embodiment, turmeric or curcumin, may be present in an amount from about 2 wt % to about 8 wt % based on the total weight of the ashwagandha, holy basil, turmeric or curcumin and ginger. In one embodiment, the holy basil may be present in an amount from about 25 wt % to about 30 wt % based on the total weight of the ashwagandha, holy basil, turmeric or curcumin and ginger. In one embodiment, the ashwagandha may be present in an amount from about 13 wt % to about 18 wt % based on the total weight of the ashwagandha, holy basil, turmeric or curcumin and ginger. In one embodiment, the ginger may be present in an amount from about 53 wt % to about 57 wt % based on the total weight of the ashwagandha, holy basil, turmeric or curcumin and ginger.

Such embodiments may further include a carrier (e.g., the solvent may be a beverage containing the embodiment of interest) in an amount from about 0.5 wt % to about 90 wt % based on the total weight of the composition. This supplement may be in a product form selected from the group consisting of a liquid solution, e.g., a beverage including but not limited to a smoothie, a shake, or a juice, an emulsion, a suspension, a dispersion, or a solid, e.g., a powder, capsule or caplet, among others.

Provided are dietary supplements, formulations, beverages, foodstuff such as a solid or semi-solid food product (a bar) that has a serving size of about 1 to 2 ounces and in addition to ashwagandha turmeric, holy basil and ginger may include a source of protein, e.g., eggs, tofu, or nuts, and optionally one or more fruits, one or more vegetables, one or more sweeteners and/or one or more flavorings, kits and methods for administration of the supplement, formulation, beverage or foodstuff, to a mammal such as a human.

DETAILED DESCRIPTION

Unless defined otherwise, all technical and scientific terms used herein have the same meaning as is commonly understood by one of skill in the art to which the claimed subject matter belongs.

It is to be understood that the foregoing general description and the following detailed description are exemplary and explanatory only and are not restrictive of any subject matter claimed. In this application, the use of the singular includes the plural unless specifically stated otherwise.

In the present description, any concentration range, percentage range, ratio range, or integer range is to be understood to include the value of any integer within the recited range and, when appropriate, fractions thereof (such as one tenth and one hundredth of an integer), unless otherwise indicated.

As used herein, "about" means ±5% of the indicated range, value, sequence, or structure, unless otherwise indicated.

It should be understood that the terms "a" and "an" as used herein refer to "one or more" of the enumerated components unless otherwise indicated or dictated by its context. The use of the alternative (e.g., "or") should be understood to mean either one, both, or any combination thereof of the alternatives. As used herein, the terms "include" and "comprise" are used synonymously.

As used herein, the term "formulation" or the term "formulations" may include a plurality of ingredients including two or more of ashwagandha, turmeric, holy basil and ginger. Such formulations may include other ingredients such as carriers, excipients, solvents, flavors, or any other ingredients as further described herein. For common excipients and carriers, see *Remington's Pharmaceutical Sciences*, infra, listing various excipients, diluents, additives, carriers, lubricants, and the like.

As used herein, the term "animal" includes any living organism characterized by voluntary movement.

As used herein, the term "subject" may include a mammal such as a human, unless specified otherwise.

As used herein, the term "%" or "wt. %" is a percent by weight value based on a total weight (taken as 100 wt. %) of the formulation with a specific set of ingredients or all of its constituent ingredients accounted for, such as listed ingredients (active and/or inactive), excipients (if any), carriers (if any), or other active ingredients (if any), unless indicated otherwise.

As used herein, the term "organic" may include ingredients that may be farmed or grown without the use of certain pesticides, antibiotics and/or genetically altered or genetically modified plants, seeds, or organisms.

As used herein, the term "non-organic" may include ingredients that may be farmed or grown, optionally with the use of pesticides, antibiotics and/or genetically altered or genetically modified plants, seeds, or organisms.

As used herein, the term "treatment" may include care provided to improve a condition or alleviate some discomfort or undesirable consequence of the condition such as a chronic disease or condition, or even an acute disease or condition or illness, etc.

As used herein, the term "symptomatic relief" may include control or alleviation of symptoms and/or side effects obtained with the aid or ingestion of one or more embodiments of the disclosed compositions.

According to one or more illustrative embodiments, formulation(s) in connection with the present disclosure may include one or more of the numerous constituents described herein.

Any one or more of the formulation(s) or embodiment(s) thereof described herein may have varying ingredient contents. Thus, for example, the amount of each ingredient may fluctuate within a certain range (but not limited to): about ±1%, up to about ±10%, as disclosed herein. The various embodiments may also include well-known excipients, carriers, fillers, pigments, colorants, preservatives, diluents, solvents, and emulsifiers suitable for use in formulations. Such embodiments may optionally include active ingredients in various forms, including, but not limited to, liquids, powders, syrups, shakes, tablets, capsules, e.g., gelatin capsules, concentrates, pills, emulsions, and the like.

Embodiments may provide dietary supplementation, nutritional supplementation, promote synergistic absorption of certain constituents, promote enhanced activity of certain constituents, promote or provide superior symptomatic relief, treatment or some other health benefit from the combination of the constituent ingredients as opposed to that of the constituent ingredients being administered separately.

In the one or more embodiments, any combination of herbs and/or natural products may be provided in a powder, e.g., a mixture of those products or as individual products, may be added to a base powder, or base liquid, e.g., soy milk, and resuspended therein, thereby providing a mixture where the combination of herbs and/or natural products is dissolved or suspended in the base liquid which may provide a pleasant taste, composition solubility, composition stability, and/or additional nutritional benefits. In addition to ashwagandha, turmeric, holy basil and ginger, the composition may include spice ingredients including, not limited to, cumin (*Cuminum cyminum*), black pepper (*Piper nigrum*), cinnamon (*Cinnamonum zevlanicum*), coriander (*Coriandrum sativum*), red pepper (*Capsicum frutescens*), clove (*Syzygium aromaticum*), ginger (*Zingiber officinale*), tejpat (*Cinnamon tamala*), fennel (*Foeniculum vulgare*), Kaala Jeera (black cumin), cardamom (*Amomum subulatum*), kalonji (*Nigella sativa*), ajowan (*Trachyspermum ammi*), mint (*Mentha piperta*), sesame seeds (*Sesamum indicum*), asafetida (*Ferula narthex*), curry leaves (*Murraya* koenigil), pomegranate (*Punica granatum*), nutmeg (*Myristica fragrans*), saffron (*Coccus sativus*), dill (*Anethum graveolens*), oregano (*Origanum vulgare*), coriander (*Coriandrum sativum*), parsley (*Petroselinum crispum*), camphor (*Cinnamomum camphor*), licorice (*Glycyrrhiza glabra*), caraway (*Carum carvl*), mustard (*Brassica juncea*), tamarind (*Tamarindus indica*), rosemary (*Rosmarinus officinalis*), onion (*Allium fistulosum*), garlic (*Allium sativum*), almonds (*Amygdalus comunis*), cashews (*Anacardium occidentale*), walnut (*Juglans nigra*), mace (*Myristica fragrans*), mango (*Magnifera indica*), prunes (*Prunus domestica*), raisins (*Vitis vinifera*), pecans (*Carya illinoensis*), figs (*Ficus carica*), fenugreek (*Trigonella foneum-gracium*), fenugreek seeds, flax (*Linum usitatissimum*), til (*Sesamum indicum*), and lemon grass (*Cymbogogon filexusosus*). Other plant materials (e.g., ginseng), teas (e.g., tea, green tea, herbal teas, etc.), purified natural ingredients of plant materials or synthetic equivalents (e.g., vanilla), inorganic salts, and sweeteners individually or in any combination may also be added to the formulations. Sweeteners can include either artificial sweeteners (e.g., cyclamate, saccharine, aspartame, acesulfame potassium, sucralose, sugar alcohols) or natural product sweeteners (stevioside, *Stevia*, sucrose, xylitol, Luohan, glucose, maltose, honey, can sugar or maple syrup etc.) may be added. Cocoa and chocolate powders may be one of the additives. Lipids (e.g., lecithin, soy lecithin) may be added (e.g., as emulsifiers), carbohydrates (e.g., sugars, starches, etc.), grains, and malts (e.g., barley malt) may also be used as ingredients. Proteins may be added or the proteins from high protein content ingredients such as peanuts or soy may be used to provide a protein content of at least about 40% by weight, or more, based on a total weight of a particular embodiment.

In one embodiment of a powder form compositions, an ashwagandha powder may range from about 10% to about 20% of the total weight of the ashwagandha, holy basil, turmeric and ginger, a turmeric powder may be in range from about 2% to about 8% based on the total weight of the composition, a tulsi powder may be in a range from about 23% to about 29% of the total weight of the ashwagandha, holy basil, turmeric and ginger, and a ginger powder may be in a range from about 52% to about 58% of the total weight of the ashwagandha, holy basil, turmeric and ginger.

In one embodiment, the ashwagandha may range from about 12% to about 18% of the total weight of the ashwagandha, holy basil, turmeric and ginger, the turmeric may be in range from about 2.5% to about 8% based on the total weight of the composition, the tulsi may be in a range from about 25% to about 29% of the total weight of the ashwagandha, holy basil, turmeric and ginger, and the ginger may be in a range from about 52% to about 56% of the total weight of the ashwagandha, holy basil, turmeric and ginger.

The powder compositions can be formulated in any suitable product form. Such product forms include but are not limited to a solid or a solution, e.g., a liquid, a dispersion, an emulsion, or a powder. The present compositions may include a carrier. A useful carrier is one that is acceptable for ingestion. Useful carriers may include, but are not limited to, one or more aqueous systems, oils such as vegetable or mineral oils, water, fruit juices, cultured dairy products, (e.g., yogurt), dairy products (e.g., milk), carbonated or non-carbonated beverages, and mixtures of the aforesaid. The powder compositions may be conveniently incorporated into a variety of liquids or solid compositions including, but not limited to, powders and other solids, liquid beverages (teas, mineral water, milk and other dairy products), capsules, tablets, food such as nutrient bars, cookies or other bakery items, etc.

The nutraceutical compositions may be administered in combination with a nutraceutically acceptable carrier. The active ingredients in such formulations may comprise from 1% by weight to 99% by weight, or alternatively, 0.1% by weight to 99.9% by weight. "Nutraceutically acceptable carrier" means any carrier, which may be a diluent or excipient that is compatible with the other ingredients of the formulation and not deleterious to the user. Thus, the compositions may be administered in combination with a nutraceutically acceptable carrier. The active ingredients in such formulations may comprise from 1% by weight to 99% by weight, or alternatively, 0.1% by weight to 99.9% by weight.

In one embodiment, the composition is optionally provided in liquid form, dehydrated form, powder form, or dehydrated powder form.

In one embodiment, the composition comprises curcumin in an amount of about 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, 1000 mg, 1100 mg, 1200 mg, 1200 mg, 1300 mg, 1400 mg, 1500 mg and being within about at least one of or just one off 1%, ±2%, ±3%, ±4%, ±5%, 16%, ±7%, ±8%, ±9%, ±10%, ±11%, ±12%, ±13%, ±14%, ±15%, ±16%, ±17%, ±18%, ±19%, ±20%, ±21%, 22%, ±23%, 24%, and ±25% for each of the mg values, respectively.

In one embodiment, the composition comprises curcumin in an amount of about 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, or 500 mg and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, 22%, ±23%, 24%, and ±25% for each of the mg values, respectively.

In one embodiment, the composition comprises ginger root in an amount of about 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, 1000 mg, 1100 mg, 1200 mg, 1200 mg, 1300 mg, 1400 mg, 1500 mg, 1600 mg, 1700 mg, 1800 mg, 1900 mg, 2000 mg, 2500 mg, 3000 mg, 3500 mg, 4000 mg, 4500 mg, or 5000 mg and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, 24%, and ±25% for each of the mg values, respectively.

In one embodiment, the composition comprises ginger root in an amount of about 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, 1000 mg, 1100 mg, 1200 mg, 1200 mg, 1300 mg, 1400 mg, 1500 mg, 1600 mg, 1700 mg, 1800 mg, 1900 mg, 2000 mg or 2500 mg and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, 24%, and ±25% for each of the mg values, respectively.

In one embodiment, the composition comprises holy basil in an amount of about 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, 1000 mg, 1100 mg, 1200 mg, 1200 mg, 1300 mg, 1400 mg, or 1500 mg, and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, 24%, and ±25% for each of the mg values, respectively.

In one embodiment, the composition comprises holy basil in an amount of about 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, 1000 mg, 1100 mg, 1200 mg, 1200 mg, 1300 mg, 1400 mg, or 1500 mg, and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, 24%, and ±25% for each of the mg values, respectively.

In one embodiment, the composition comprises ashwagandha in an amount of about 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, or 1000 mg and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, 24%, and ±25% for each of the mg values, respectively.

In one embodiment, the composition comprises ashwagandha in an amount of about 100 mg, 105 mg, 110 mg, 115 mg, 120 mg, 125 mg, 130 mg, 135 mg, 140 mg, 145 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 450 mg, 500 mg, 550 mg, 600 mg, 700 mg, 800 mg, 900 mg, or 1000 mg and being within about at least one of or just one of ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, 24%, and ±25% for each of the mg values, respectively.

In one embodiment, the amounts are per serving.

In one embodiment, the amounts are daily values.

In one embodiment, the present disclosure provides dietary supplements.

Provided herein are methods and formulations of dietary supplements that when administered to an individual treat, support and/or enhance, for example, repair properties or immune function, or provide an anti-inflammatory effect or optionally provide an anti-oxidant effect or decrease fatigue or nausea, or any combination thereof.

Exemplary Additional Components

The methods, dietary supplements and formulations described herein may comprise at least one of the ingredients (components) discussed below. In certain embodiments, formulations described herein comprise a plurality of ingredients described below. In certain embodiments, two or more ingredients may be combined in an amount suitable to provide synergistic effects. Formulations and dietary supplements described herein may contain other active and inactive ingredients in addition to two or more ingredients described herein.

Thus, the compositions may include other compounds or compositions, such as mixtures, including but not limited to one or more of iron, useful to overcome fatigue and stimulate bone marrow, vitamin B12, useful to overcome fatigue, vitamin D, useful to increase bone development, flax seed, which has anti-inflammatory, biotin, magnesium, immune boosters such as garlic, L-glutamine, polyphenols such as green tea and vitamin C. In one embodiment, the compositions may not include calcium and/or anti-oxidants like vitamin E, selenium or zinc.

The additional ingredients or the carrier may provide for a caloric supplement.

In one embodiment, the composition may include biotin (alternatively called vitamin H or coenzyme R a water-soluble B-vitamin (vitamin $B_7$)). Certain methods and formulations described herein comprise a suitable amount of biotin or derivative or analog thereof. In certain embodiments, methods and formulations of dietary supplements comprise biotin or derivative or analog thereof in an amount suitable to support and/or enhance at least one of: blood sugar control, cholesterol levels, insulin response to glucose load, manufacture and utilization of carbohydrates/fats/amino acids, maintenance of insulin receptor site sensitivity, glucokinase activity, hair growth, nail health and metabolism.

In one embodiment, the composition may include vitamin C or L-ascorbic acid, or ascorbate: Certain methods and formulations described herein comprise a suitable amount of vitamin C or derivative or analog thereof. In certain embodiments, methods and formulations of dietary supplements comprise vitamin C or derivative or analog thereof in an amount suitable to support and/or enhance at least one of: neutralization of toxins, glutathione levels, immune system, removal of heavy metal toxins, blood sugar metabolism, beta cells of the pancreas, antioxidation, and growth and repair of tissues. In some embodiments, the concentration of vitamin C in the formulation is from about 1% to about 8% by weight. In some embodiments is a formulation described herein, the concentration of vitamin C in the formulation is from about 2% to about 9% by weight.

In one embodiment, the composition may include vitamin D. In some embodiments, the source of Vitamin D is vitamin D3 (also known as cholecalciferol). In some embodiments, the source of Vitamin D is vitamin D2 (ergocalciferol). Certain methods and formulations described herein comprise a suitable amount of vitamin D or derivative or analog thereof. In certain embodiments, methods and formulations of dietary supplements comprise vitamin D or derivative or analog thereof in an amount suitable to support and/or enhance at least one of: blood sugar metabolism, heart and cardiovascular health, immune function, insulin receptor site activity, bone health, reducing the risk of some forms of cancer, alleviating musculoskeletal pain.

In one embodiment, the composition may include vitamin B12 also called cobalamin. In some embodiments the source of vitamin B12 is methylcobalamin. In some embodiments, the source of Vitamin B12 is cyanocobalamin. Certain methods and formulations described herein comprise a suitable amount of vitamin B12 or derivative or analog thereof. In certain embodiments, methods and formulations of dietary supplements comprise vitamin B12 or derivative or analog thereof in an amount suitable to support and/or enhance at least one of: healthy homocysteine levels, healthy red blood cells, energy production, immune system and neuro-protection. In some instances, the concentration of vitamin B12 is from about 0.5% to about 10%, about 1% to about 10%, about 1% to about 8%, about 2% to about 7%, or about 3% to about 6% by weight.

In one embodiment, the composition may include L-glutamine. Certain methods and formulations described herein comprise a suitable amount of L-glutamine or derivative or analog thereof. In certain embodiments, methods and formulations of dietary supplements comprise L-glutamine or derivative or analog thereof in an amount suitable to support and/or enhance at least one of: sulfation, methylation, detoxification, glutathione storage, oxidative stress management and small intestine health. In some embodiments, the concentration of glutamine in the formulation is from about 0.5% to about 6% by weight. In some cases, the concentration of glutamine is from about 0.5% to about 6%, about 0.8% to about 5%, about 1% to about 4%, or about 1.2% to about 3% by weight.

Exemplary Formulations

Provided herein are exemplary formulations.

In some embodiments, the concentration of ginger in a liquid formulation is from about 1% to about 10% by total weight. In some cases, the concentration of ginger is from about 0.5% to about 15%, about 1% to about 10%, about 2% to about 8%, or about 3% to about 6% by total weight.

In some embodiments, the concentration of turmeric extract in a liquid formulation is from about 0.1% to about 1% by total weight. In some instances, the concentration of curcumin is from about 0.5% to about 10%, about 1% to about 8%, about 2% to about 7%, or about 3% to about 6% by total weight.

In some embodiments, concentration of ashwagandha root extract in a liquid formulation is from about 0.3% to about 0.6% by total weight.

In some embodiments, the concentration of holy basil leaf extract in a liquid formulation is from about 0.5% to about 5% by total weight. —In some instances, the concentration of ashwagandha root extract is from about 1% to about 30%, about 2% to about 20%, about 4% to about 16%, or about 6% to about 12% by total weight.

In some instances, the concentration of holy basil leaf extract is from about 1% to about 15%, about 3% to about 13%, or about 4% to about 10% by total weight.

In some embodiments, one or more formulations described herein may be used as a dietary supplement and/or anticancer agent. The formulations may comprise either the above listed ingredients, its active compounds, or said ingredients and active compounds plus one or more nutraceutically acceptable carriers. In addition to the ingredients discussed above, methods of determining active ingredients and screening for activity in the formulations described herein can be carried out according to methods known to those of skill in the art, and according to methods described in the examples herein. Formulations described herein may be mixed with nutraceutically acceptable carriers known to those of skill in the art, and administered according to methods known to those of skill in the art including: oral administration in the form of juice or milk or other beverage, powders, tablets, suspension, emulsifiers, capsules, granules, suspensions, spirits, or syrups.

In addition, well-known excipients in the form of solid or liquid maybe used. The several examples of excipients used to administer the dosage forms may include for powders for oral administration: lactose, crystalline cellulose, starch, dextrin, calcium phosphate, calcium carbonate, synthetic and natural aluminum dioxide, magnesium oxide, dried aluminum hydroxide, magnesium stearate, and/or sodium bicarbonate; Excipients in liquids may include water, glycerin, propylene glycol, sweet-taste syrup, ethanol, fatty oil, ethylene glycol, polyethylene glycol, or sorbitol.

Formulations discussed herein can be administered in any of the forms considered herein, or otherwise known to those of skill in the art. In some embodiments, the formulation is administered orally in a liquid form, either as an extract, concentrated extract or other liquid form. In some embodiments, the formulation is administered orally once a day, twice a day, three times a day, or four times a day, with each dosing varying between, for example, from about 2 oz to about 40 oz, for instance, about 5 oz to about 20 oz such as 8 oz, 10 oz, 16 oz or 24 oz.

A formulation described herein may be administered as a dietary supplement to facilitate normal physiological function and growth.

Provided in Tables A-D are exemplary formulations:

TABLE A

| | Amount Per Serving | Daily Amount |
|---|---|---|
| Vitamin C | 2.5-250 mg | 10-500 mg |
| Vitamin D | 250-1,500 IU | 1,000-3,000 IU |
| Holy basil | 0.1 g-0.5 g | 0.5 g-1 g |
| Vitamin B12 | 25-250 mcg | 100-1000 mcg |
| Biotin | 6-125 mcg | 25-250 mcg |
| Ashwagandha | 75 mg-250 mg | 300 mg-500 mg |
| Curcumin (tetrahydroxycurcumin) | 25 mg-150 mg | 50 mg-300 mg |
| L-Glutamine | 0.5-3 grams | 2.5-10 grams |
| Ginger root | 0.25 g-1 g | 1 g-2 g |

TABLE B

| | Amount Per Serving | Daily Value |
|---|---|---|
| Vitamin C | 100-500 mg | |
| Vitamin B12 | 100-1000 mcg | |

TABLE B-continued

|  | Amount Per Serving | Daily Value |
|---|---|---|
| Biotin | 25-250 mcg | |
| Magnesium | 25-250 mg | |
| Ashwagandha Root Extract | 70 mg-300 mg | 250 mg-600 mg |
| Holy Basil Leaf Extract | 0.05 g-1 g | 0.25 g-2 g |
| Curcumin | 12 mg-150 mg | 50 mg-300 mg |
| Ginger Root Extract | 0.1 g-2 g | 0.5 g-4 g |
| Iron | 1-12 mg | 4-25 mg |
| Flax seed | 2.5-25 grams | 10-50 grams |
| Garlic | 125-2500 mg | 500-5000 mg |
| L-Glutamine | 0.5-5 grams | 2.5-10 grams |

TABLE C

|  | Amount Per Serving | Daily Value |
|---|---|---|
| Vitamin C | 100-500 mg | |
| Ashwagandha | 250 mg | 500 mg |
| Ginger | 1 g | 2 g |
| Vitamin B12 | 100-1000 mcg | |
| Biotin | 25-250 mcg | |
| Curcumin | 50 mg | 100 mg |
| Magnesium | 6-125 mg | 25-250 mg |
| Holy basil | 0.5 g | 1 g |

TABLE D

|  | Amount Per 8 oz Serving | Daily Value |
|---|---|---|
| Ashwagandha | 100 mg to 500 mg | Up to 2 g |
| Ginger | 0.05 g to 0.5 g | Up to 5 g |
| Curcumin | 25 mg to 250 mg | Up to 2 g |
| Holy basil | 250 mg to 500 mg | Up to 2 g |

The physical form of the unit may be solid, liquid or a semi solid. In the solid form, the unit is a chewable lozenge tablet, a sugar coated oral tablet, a polymer film coated tablet, a hard gelatin encapsulated tablet, a soft gelatin encapsulated tablet. In the solid form, the unit can also be a sachet, a bubble bag or an herbal dip bag containing predetermined amounts the plant ingredients. When the unit is sachet or bag type, the constituents of the unit is mixed with hot water and consumed as a health drink. When the unit is an herbal dip bag type, the herbal dip bag is dipped into hot water and consumed as a polyherbal infusion.

In the solid form, the plant ingredients may be combined with excipients such suitable edible carriers, binders, diluents, disintegrating agents, coloring agents, fillers, stabilizers, emulsifiers, film-forming agents, plasticizers, wetting agents, thickeners, lubricants and sweetening agents.

In the liquid form, the unit is a polyherbal syrup or a polyherbal smoothie health drink.

In the liquid form, the plant ingredients are combined with suitable liquid carrier, a coloring agent, a flavoring agent, a preservative and a sweetening agent. The liquid carrier is selected from water, fatty oil, glycol, oil, alcohol and combinations thereof.

In the semi-solid form, the unit of the polyherbal composition is in the form of a jelly.

In one embodiment of the disclosure, the polyherbal composition comprises powdered plant parts of different herbs.

The invention will be further described by the following non-limiting examples.

Example 1

In one embodiment, the composition may have about 50 wt % to about 60 wt %, e.g., about 55 wt %, whole ginger extract relative to the total wt % of ginger, ashwagandha, holy basil and turmeric or curcumin.

In one embodiment, the composition may have about 5 wt % to about 20 wt %, e.g., about 10 wt % to about 18 wt %, ashwagandha relative to the total wt % of ginger, ashwagandha, holy basil and turmeric or curcumin.

In one embodiment, the composition may have about 25 wt % top about 30 wt %, e.g., about 27 wt %, of tulsi herb relative to the total wt % of ginger, ashwagandha, holy basil and turmeric or curcumin.

In one embodiment, the composition may have about 1 wt % to about 8 wt %, about 2.5 to about 8 wt %, of curcumin relative to the total wt % of ginger, ashwagandha, holy basil and turmeric or curcumin.

Example 2

In one embodiment, the ratio of basil to ginger extract in a composition is about 0.5:2, 1:1 or 1:2.

In one embodiment, the ratio of ashwagandha to ginger extract in a composition is about 1:2, 1:3, 1:4 or 1:6.

In one embodiment, the ratio of curcumin or turmeric to ashwagandha in a composition is 1:6, 1:10, 1:1, 1.3:1, 1:1.25, or 1:1.5.

Example 3

In one embodiment, the composition may have about 0.5 gm to about 1 gm, about 0.3 gm to about 7 gm or about 0.25 to about 0.5 gm per serving of Syussai whole ginger extract.

In one embodiment, the composition may have about 150 mg to about 250 mg, about 100 to about 170 mg or about 75-about 125 mg per serving of ashwagandha.

In one embodiment, the composition may have about 0.25 mg to about 0.5 mg, about 0.15 to about 0.35 mg, or about 0.125 to about 0.25 mg per serving of tulsi herb.

In one embodiment, the composition may have about 12 mg to about 75 mg, about 15 mg to about 100 mg, or about 25 mg to about 150 mg per serving of turmeric or curcumin.

Example 4

|  | Exemplary Daily Value | Exemplary Individual Dose | Formula A | Formula B | Formula C | Formula D | Formula E |
|---|---|---|---|---|---|---|---|
| Ginger | 1-2 g | 0.25 g-1 g | 0.25 g | 0.5 g | 0.75 g | 1 g | 0.5 |
| Ashwagandha | 300-500 mg | 75-250 mg | 100 mg | 200 mg | 250 mg | 75 mg | 100 mg |
| Tulsi | 0.5-1 g | 0.1-0.5 g | 0.5 g | 0.4 g | 0.3 g | 0.2 g | 0.1 g |
| Curcumin | 50-300 mg | 6-50 μg | 50 μg | 6 μg | 45 μg | 15 μg | 25 μg |
| Flax seed | 25-35 gm | 25-35 grams |  | 25-35 grams |  | 25-35 grams |  |

-continued

|  | Exemplary Daily Value | Exemplary Individual Dose | Formula A | Formula B | Formula C | Formula D | Formula E |
|---|---|---|---|---|---|---|---|
| Iron |  | 4-25 mg |  |  | 15 mg |  | 25 mg |
| Vitamin B12 |  | 100-1000 mcg | 1000 mcg | 500 mcg |  | 100 mcg |  |
| Biotin |  | 25-250 mcg | 25 mcg |  | 150 mcg |  | 250 mcg |
| Vitamin D |  | 1000-3000 IU | 3000 IU | 2000 IU |  | 1000 IU |  |
| Vitamin C |  | 100-500 mg |  | 100 mg | 250 mg |  | 500 mg |

Example 5

Individual doses or daily values may be provided in a single container, e.g., one where a powder concentrate is added to a carrier such as tea, e.g., green tea, milk, e.g., soy milk, cow's milk, almond milk, oat milk, so as to suspend or dissolve the powder. For example, curcumin or turmeric at 25 to 100 mg per dose or 100 to 200 mg/day is dissolved or suspended in a liquid and portions thereof may be consumed throughout the day. Syussai whole Ginger extract at 2 gms per day or 100 mg/kg dissolved or suspended in a liquid and portions thereof may be consumed throughout the day. Ashwagandha at 300-500 mg/day is dissolved or suspended in a liquid and portions thereof may be consumed throughout the day. Tulsi herb at 500 mg-1 gm/day is dissolved or suspended in a liquid and portions thereof may be consumed throughout the day. Ground Flax seed at 25-35 gm/day is dissolved or suspended in a liquid and portions thereof may be consumed throughout the day.

Example 6

In one embodiment, individual doses or daily values, e.g., in a tablet, for ashwagandha, ginger, holy basil and/or turmeric or curcumin as disclosed herein may be combined with one, two, three, four five, ten, fifteen, twenty or more of the following: calcium carbonate, potassium chloride, dibasic calcium phosphate, magnesium oxide, microcrystalline cellulose, ascorbic acid (Vit. C), L-alpha tocopheryl acetate (Vit. E), maltodextrin, modified corn starch, corn starch, beta-carotene, BHT (to preserve freshness), biotin, calcium pantothenate, cholecalciferol (Vit. $D_3$), chromium picolinate, copper sulfate, crospovidone, cyanocobalamin (Vit. $B_{12}$), folic acid, gelatin, hypromellose, lutein, lycopene, magnesium stearate, manganese sulfate, medium-chain triglycerides, niacinamide, phytonadione (vit. K), dextrose, potassium iodide, pyridoxine hydrochloride (Vit. $B_6$), riboflavin (vit. $B_2$), silicon dioxide, sodium ascorbate, sodium molybdate, sodium selenate, thiamine mononitrate (vit. $B_1$), titanium dioxide, tocopherols, vitamin A, or zinc oxide.

Individual doses or daily values, e.g., in a tablet, for ashwagandha, ginger, holy basil and/or turmeric or curcumin as disclosed herein may be combined with one, two, three, four five, ten, fifteen, twenty or more of the following: calcium carbonate, potassium chloride, dibasic calcium phosphate, magnesium oxide, microcrystalline cellulose, ascorbic acid (Vit. C), L-alpha tocopheryl acetate (Vit. E), maltodextrin, beta-carotene, biotin, calcium pantothenate, cholecalciferol (Vit. $D_3$), chromium picolinate, copper sulfate, crospovidone, cyanocobalamin (Vit. $B_{12}$), folic acid, gelatin, hypromellose, lutein, lycopene, magnesium stearate, manganese sulfate, medium-chain triglycerides, niacinamide, phytonadione (vit. K), potassium iodide, pyridoxine hydrochloride (vit. $B_6$), riboflavin (vit. $B_2$), sodium ascorbate, sodium molybdate, thiamine mononitrate (vit. $B_1$), or vitamin A.

Individual doses or daily values, e.g., in a tablet, for ashwagandha, ginger, holy basil and/or turmeric or curcumin as disclosed herein may be combined with one, two, three, four five, ten, fifteen, twenty or more of the following: calcium carbonate, potassium chloride, dibasic calcium phosphate, magnesium oxide, microcrystalline cellulose, ascorbic acid (Vit. C), L-alpha tocopheryl acetate (Vit. E), maltodextrin, modified corn starch, corn starch, beta-carotene, BHT (to preserve freshness), biotin, calcium pantothenate, cholecalciferol (Vit. $D_3$), chromium picolinate, copper sulfate, crospovidone, cyanocobalamin (Vit. $B_{12}$), folic acid, gelatin, hypromellose, lutein, lycopene, magnesium stearate, manganese sulfate, medium-chain triglycerides, niacinamide, phytonadione (vit. K), polydextrose, potassium iodide, pyridoxine hydrochloride (vit. $B_6$), red 40 lake, riboflavin (vit. $B_2$), silicon dioxide, sodium ascorbate (to preserve freshness), sodium molybdate, sodium selenate, talc, thiamine mononitrate (vit. $B_1$), titanium dioxide, tocopherols (to preserve freshness), vitamin A acetate, or zinc oxide.

For example, ranges are as follows:

| Amount Per Serving |
|---|
| Vitamin A 500-1000 mcg (40% as Beta-Carotene) |
| Vitamin C 40-120 mg |
| Vitamin $D_3$ 10-50 mcg |
| Vitamin E 10-40 mg |
| Vitamin K 10-150 mcg |
| Thiamin 1-2 mg |
| Riboflavin 1-3 mg |
| Niacin 10-30 mg |
| Vitamin $B_6$ 0.5-5 mg |
| Folate 500-750 mcg DFE (400 mcg Folic Acid) |
| Vitamin $B_{12}$ 1-50 mcg |
| Biotin 10-50 mcg |
| Pantothenic Acid 5-200 mg |
| Calcium 220 mg |
| Phosphorus 10-100 mg |
| Iodine 100-200 mcg |
| Magnesium 25-150 mg |
| Zinc 5-15 mg |
| Selenium 10-100 mcg |
| Copper 0.1-10 mg |
| Manganese 1-5 mg |
| Chromium 10-150 mcg |
| Molybdenum 10-100 mcg |
| Chloride 50-500 mg |
| Potassium 50-200 mg |
| Lutein 100-500 mcg |
| Lycopene 100-500 mcg |

Specific amounts are as follows:

| Amount Per Serving |
| --- |
| Vitamin A 750 mcg |
| (40% as Beta-Carotene) |
| Vitamin C 60 mg |
| Vitamin D$_3$ 25 mcg (1,000 IU) |
| Vitamin E 22.5 mg |
| Vitamin K 30 mcg |
| Thiamin 1.5 mg |
| Riboflavin 1.7 mg |
| Niacin 20 mg |
| Vitamin B$_6$ 3 mg |
| Folate 667 mcg DFE |
| (400 mcg Folic Acid) |
| Vitamin B$_{12}$ 25 mcg |
| Biotin 30 mcg |
| Pantothenic Acid 10 mg |
| Calcium 220 mg |
| Phosphorus 20 mg |
| Iodine 150 mcg |
| Magnesium 50 mg |
| Zinc 11 mg |
| Selenium 19 mcg |
| Copper 0.5 mg |
| Manganese 2.3 mg |
| Chromium 50 mcg |
| Molybdenum 45 mcg |
| Chloride 72 mg |
| Potassium 80 mg |
| Lutein 250 mcg |
| Lycopene 300 mcg |

Example 7

In one example, individual doses or daily values, e.g., in a tablet, for ashwagandha, ginger, holy basil and/or turmeric or curcumin as disclosed herein may be combined with one, two three, four, five, ten, twenty or more of the following: calcium carbonate, magnesium oxide, potassium chloride, ascorbic acid, dibasic calcium phosphate, microcrystalline cellulose, maltodextrin, di-alpha tocopheryl acetate, modified corn starch, beta-carotene, BHT, biotin, calcium pantothenate, cholecaciciterol, chromium picolinate, copper sulfate, corn starch, crospovidone, cyanocobalamin, ferrous fumarate, folic acid, gelatin, hydrogenated palm oil, hypromelloses, lutein, magnesium stearate, manganese sulfate, medium-chain triglycerides, niacinamide, nickelous sulfate, phytonadione (Vit. K), polydextrose, potassium iodide, pyridoxine hydrochloride, riboflavin, silicon dioxide, sodium ascorbate, sodium metavanadate, sodium molybdate, sodium selenate, talc, thiamine mononitrite, titanium dioxide, tocopherols, or vitamin A acetate.

Individual doses or daily values, e.g., in a tablet, for ashwagandha, ginger, holy basil and/or turmeric or curcumin as disclosed herein may be combined with one, two, three, four five, ten, fifteen, twenty or more of the following: calcium carbonate, potassium chloride, dibasic calcium phosphate, magnesium oxide, microcrystalline cellulose, ascorbic acid, L-alpha tocopheryl acetate, maltodextrin, beta-carotene, biotin, calcium pantothenate, cholecalciferol, chromium picolinate, copper sulfate, crospovidone, cyanocobalamin, folic acid, gelatin, hypromellose, lutein, lycopene, magnesium stearate, manganese sulfate, medium-chain triglycerides, niacinamide, phytonadione, potassium iodide, pyridoxine hydrochloride, riboflavin, sodium ascorbate, sodium molybdate, thiamine mononitrate, or vitamin A Exemplary ranges are as follows:

| Amount Per Serving |
| --- |
| Vitamin A 2000-7000 IU |
| (43% as Beta-Carotene) |
| Vitamin C 25-200 mg |
| Vitamin D 250-2,000 UI |
| Vitamin E 10-50 IU |
| Vitamin K 25-150 mcg |
| Thiamin 0.5-3 mg |
| Riboflavin 0.5-3 mg |
| Niacin 5-25 mg |
| Vitamin B$_6$ 1-10 mg |
| Folic Acid 200-800 mcg |
| Vitamin B$_{12}$ 1-100 mcg |
| Biotin 10-500 mcg |
| Pantothenic Acid 1-15 mg |
| Calcium 200-2,000 mg |
| Iron 1-20 mg |
| Phosphorus 10-2000 mg |
| Iodine 100-300 mcg |
| Magnesium 50-500 mg |
| Zinc 10-30 mg |
| Selenium 10-50 mcg |
| Copper 0.2-10 mg |
| Manganese 1-3 mg |
| Chromium 10-150 mcg |
| Molybdenum 10-200 mcg |
| Chloride 50-500 mg |
| Potassium 50-1000 mg |
| Nickel 1-10 mcg |
| Silicon 1-10 mg |
| Vanadium 5-20 mcg |
| Lutein 150-500 mcg |

Exemplary specific values are as follows:

| Amount Per Serving |
| --- |
| Vitamin A 3,500 IU |
| (43% as Beta-Carotene) |
| Vitamin C 100 mg |
| Vitamin D 1,000 UI |
| Vitamin E 35 IU |
| Vitamin K 50 mcg |
| Thiamin 1.1 mg |
| Riboflavin 1.1 mg |
| Niacin 14 mg |
| Vitamin B$_6$ 5 mg |
| Folic Acid 400 mcg |
| Vitamin B$_{12}$ 50 mcg |
| Biotin 30 mcg |
| Pantothenic Acid 5 mg |
| Calcium 300 mg |
| Iron 8 mg |
| Phosphorus 20 mg |
| Iodine 150 mcg |
| Magnesium 100 mg |
| Zinc 15 mg |
| Selenium 22 mcg |
| Copper 0.5 mg |
| Manganese 2.3 mg |
| Chromium 52 mcg |
| Molybdenum 50 mcg |
| Chloride 72 mg |
| Potassium 80 mg |
| Nickel 5 mcg |
| Silicon 2 mg |
| Vanadium 10 mcg |
| Lutein 300 mcg |

Example 8

Examples of specific 16 oz beverages (a "serving") include but are not limited to:

Beverage A
- 1.5 cup (12 oz) milk such as almond milk or soy milk.
- 1 cup of berries (fresh or frozen), such as strawberries or blueberries or raspberries
- 1 cup of bananas (fresh or frozen)
- 2 tablespoons of honey or another sweetener(s) in an amount that corresponds in sweetness to 2 tablespoons of honey
- ashwagandha, holy basil, turmeric and ginger in amounts disclosed herein, e.g., 2 capsules of each of ashwagandha, holy basil and turmeric, and 1 capsule of ginger, e.g., ginger at 0.05 gm to 0.5 gm per 8 oz or up to 5 g per day or 100 mg to 500 mg/kg; ashwagandha at 100 mg to 500 mg per 8 oz or up to 2 g/day; holy basil at 250 mg to 500 mg per 8 oz or up to 2 g/day; and curcumin at 25 mg to 250 mg per 8 oz or up to 2 g/day
- optionally 1 tablespoon of lemon Beverage B
- 12 oz of water including flavored water such as coconut water (no lemon) or tea (e.g., green tea) and optionally lemon, for example, 2 tablespoons of lemon
- 1 cup of berries (fresh or frozen) such as strawberries or blueberries or raspberries
- 1 cup of bananas (fresh or frozen)
- 2 tablespoons of honey or another sweetener(s) in an amount that corresponds in sweetness to 2 tablespoons of honey
- ashwagandha, holy basil, turmeric and ginger in amounts disclosed herein, e.g., 2 capsules of each of ashwagandha, holy basil and turmeric and 1 capsule of ginger, e.g., ginger at 0.05 gm to 0.5 gm per 8 oz or up to 5 g per day or 100 mg to 500 mg/kg; ashwagandha at 100 mg to 500 mg per 8 oz or up to 2 g/day; holy basil Vanadium 10 mcg Lutein 300 mcg at 250 mg to 500 mg per 8 oz or up to 2 g/day; and curcumin at 25 mg to 250 mg per 8 oz or up to 2 g/day
- optionally 1 tablespoon of lemon Beverage C
- 12 oz of green tea, e.g., decaffeinated green tea
- 1 cup of berries (fresh or frozen), e.g., raspberries or blueberries or strawberries
- 1 cup of bananas (fresh or frozen)
- 2 tablespoons of honey or another sweetener(s) in an amount that corresponds in sweetness to 2 tablespoons of honey
- ashwagandha, holy basil, turmeric and ginger in amounts disclosed herein, e.g., 2 capsules of each of ashwagandha, holy basil and turmeric, and 1 capsule of ginger, e.g., ginger at 0.05 gm to 0.5 gm per 8 oz or up to 5 g per day or 100 mg to 500 mg/kg; ashwagandha at 100 mg to 500 mg per 8 oz or up to 2 g/day; holy basil at 250 mg to 500 mg per 8 oz or up to 2 g/day; and curcumin at 25 mg to 250 mg per 8 oz or up to 2 g/day.
- optionally 2 tablespoons of lemon All publications, patents and patent applications are incorporated herein by reference. While in the foregoing specification, this invention has been described in relation to certain preferred embodiments thereof, and many details have been set forth for purposes of illustration, it will be apparent to those skilled in the art that the invention is susceptible to additional embodiments and that certain of the details herein may be varied considerably without departing from the basic principles of the invention.

What is claimed is:

1. A composition comprising curcumin, ginger extract, ashwagandha extract, and Tulsi Herb extract for the preparation of a liquid formulation and/or beverage, wherein the liquid formulation and/or beverage is a serving of about 8 oz and comprises:
   - 25 mg to 250 mg curcumin;
   - 50 mg to 500 mg ginger extract;
   - 100 mg to 500 mg ashwagandha extract; and
   - 250 mg to 500 mg Tulsi herb extract.

2. A composition comprising
   - 25 mg to 250 mg turmeric;
   - 50 mg to 500 mg ginger extract;
   - 100 mg to 500 mg ashwagandha extract; and
   - 250 mg to 500 mg Tulsi herb extract,
   wherein the composition is comprised in a liquid formulation and/or beverage, and wherein the liquid formulation and/or beverage is a serving of about 8 oz.

3. The composition of claim 1 which further comprises one or more of vitamin C, vitamin D, vitamin B12, biotin, magnesium, iron, flax seed, L-glutamine, or garlic.

4. The composition of claim 1 which does not include calcium, vitamin E, zinc or selenium.

5. The composition of claim 1 which does not include an additional anti-oxidant.

6. The composition of claim 1 wherein the composition comprises about 100 mg to about 200 mg curcumin.

7. The composition of claim 1 wherein the composition comprises about 300 mg to about 500 mg ashwagandha extract.

8. The composition of claim 1 which further comprises a source of protein, and optionally one or more fruits, one or more vegetables, one or more sweeteners and/or one or more flavorings.

9. The composition of claim 1 which further comprises one or more fruits, one or more sweeteners, and/or one or more flavorings.

10. A method comprising administering to a human in need thereof the composition of claim 1.

* * * * *